Dec. 11, 1951  E. F. MERCIER ET AL  2,578,439
BALANCED DOUBLE-ACTING ENGINE
Filed Aug. 6, 1947  5 Sheets-Sheet 1

INVENTORS
Ernest Frederic Mercier
& Pierre Ernest Mercier
By George H. Cooley
ATTORNEY Dec. 11, 1951  E. F. MERCIER ET AL  2,578,439
BALANCED DOUBLE-ACTING ENGINE
Filed Aug. 6, 1947  5 Sheets-Sheet 2

INVENTORS
Ernest Frederic Mercier
& Pierre Ernest Mercier
By George W. Corey
ATTORNEY Dec. 11, 1951  E. F. MERCIER ET AL  2,578,439
BALANCED DOUBLE-ACTING ENGINE
Filed Aug. 6, 1947  5 Sheets-Sheet 3
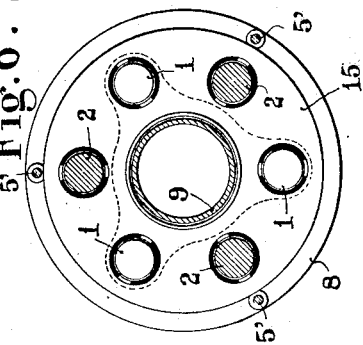
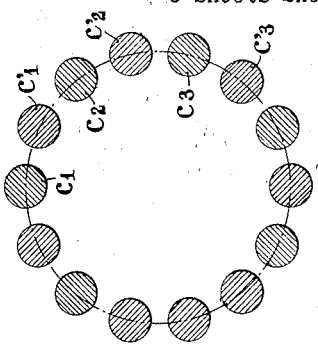
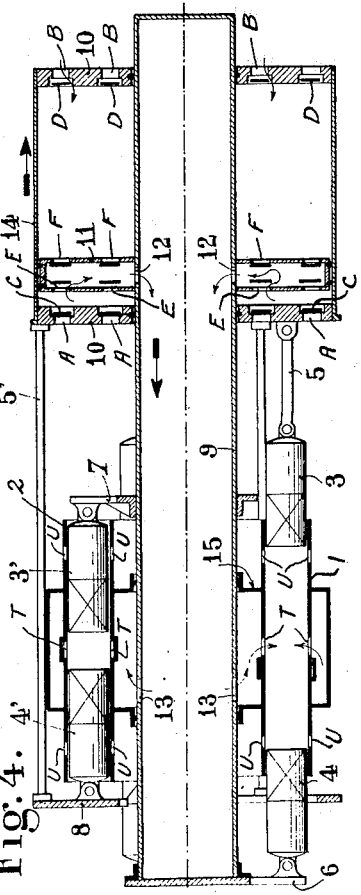
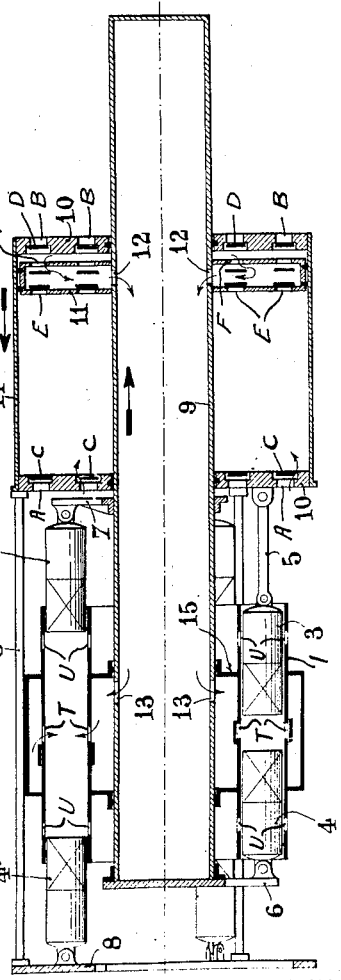
INVENTORS
Ernest Frederic Mercier &
Pierre Ernest Mercier
By George H. Carey
ATTORNEY

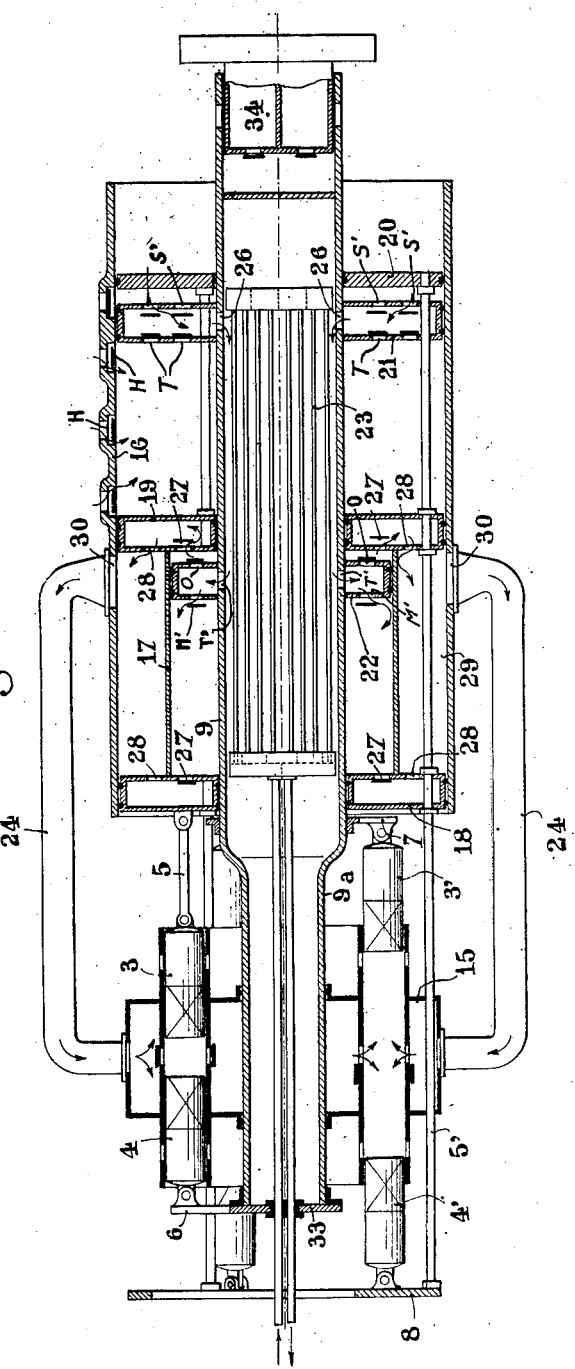

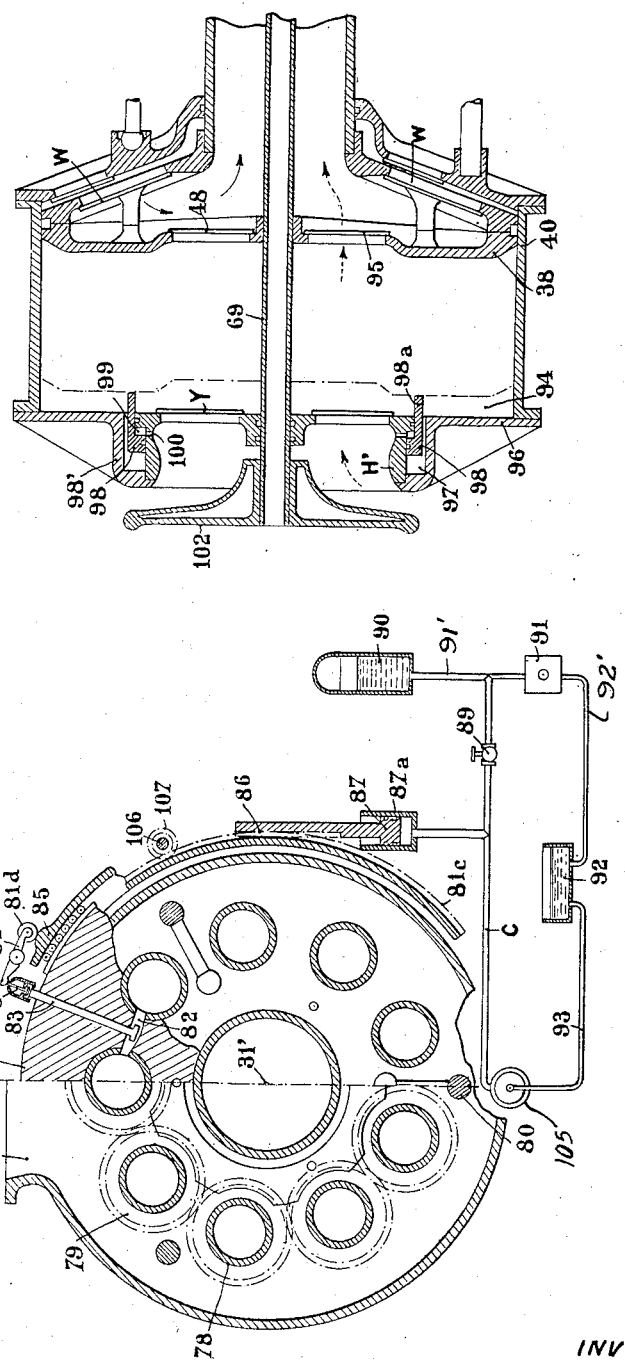

Patented Dec. 11, 1951

2,578,439

UNITED STATES PATENT OFFICE 2,578,439

BALANCED DOUBLE-ACTING ENGINE

Ernest Frédéric Mercier and Pierre Ernest Mercier, Paris, France, assignors, by mesne assignments, to Moore, Inc., Atlanta, Ga., a corporation of Georgia Application August 6, 1947, Serial No. 766,672
In France November 23, 1940

Section 1, Public Law 690, August 8, 1946
Patent expires November 23, 1960

27 Claims. (Cl. 230—56)

This invention relates to improvements in prime mover apparatus and especially to a gas generating and air compressor apparatus. The invention relates more particularly to a combination including a balanced double acting internal combustion engine and air compressing means which cooperate to supply hot compressed gases which may be utilized either by expansion in a gas turbine or by expansion in a gas propulsion nozzle or jet or other equivalent prime mover.

It is known that the energy liberated by the expansion of a compressed gas is a function of both the pressure and the temperature. When a gas is placed under a predetermined pressure above the atmosphere it is important that its temperature shall be as high as possible at the initial moment of its expansion having regard to the energy which may be recovered therefrom. In addition it is equally advantageous that the temperature of the compressed gas shall be high when it contains water vapor or substances capable of being condensed to a liquid or solid.

When the energy necessary for the production of compressed gas is obtained from a heat engine it is especially advantageous that the quantities of heat lost through the walls of the heat engine shall be absorbed by the compressed gas. This is one of the essential objects of the present invention.

Although this recovery is desirable it nevertheless should not be obtained at the expense of chilling and of the proper considerations of maintenance of the mechanical parts of the heat engine. It is, therefore, essential that the average temperature of the parts shall not be too high and, accordingly, it is essential that the expansion of the gas utilized in the engine shall be as complete as possible. The present invention provides special apparatus for obtaining these results in assuring for the expansion stroke of the engine elements a value greater than for the compression stroke of the same elements.

On the other hand, because of considerations of the durability of materials, safety, efficiency as well as numerous different considerations of accommodation, it is important in such a machine for developing energy that the apparatus shall be such as will assure the absence of substantial reaction on the supports and the absence of vibrations. In fact, the present invention comprises machines of which all the parts are subjected only to moderate stresses and which, because of the construction, do not transmit any substantial force either to the mechanical jointed connections of the machine or to the supports, a condition which in particular excludes all possibility of vibration, this being a condition particularly desirable in the different fields of locomotive apparatus.

The invention resides in a machine for the production of hot compressed gas comprising both compressor units and engine units and characterized by the fact that the air compressed by the compressor units is utilized for supplying the engine units as well as for scavenging and for cooling these units, the cylinders of either kind of unit being disposed on the same axis or with their axes parallel to each other in such a manner that all crank and connecting rod connections are avoided while assuring the cooperation between the movable parts of the units of each kind.

In order to eliminate all reaction due to unbalancing, or due to masses moving in reciprocating movement or to absence of symmetry in the power effort or the resistance thereto, all of the engine pistons are movable in cylinders without end walls. The same is true of the pistons of the compressors, at least when the lateral walls of these compressors are not also movable. Thus, the only elements which need be fixed are the engine cylinders and the supporting frames thereof. All of the engine cylinders are distributed in two sets and all of the movable elements, pistons, and in some cases the compressor cylinders, are distributed into two groups in such a manner that each movable element appertaining to one of the groups has a corresponding element in the other group geometrically identical therewith (not necessarily of the same mass) subjected at each moment precisely but in opposed relation to the same active forces and resistances, whether the functioning be normal or abnormal, and subjected also very considerably to the same passive resistances, including the resistance of the air and friction. All of the movable elements forming parts of the same group are rigidly connected one to the other in such a way as to constitute a rigid whole except for the play of elastic means interposed, where such is necessary, to absorb a suitable fraction of the energy occasioned by accidental contact of the two movable groups.

The two groups thus constituted reciprocate freely in opposite directions as a unit. Each group may be connected on the one hand to the other group and on the other hand to the frame of the machine by a yielding or synchronizing mechanism, for example, by means of suspension shafts, of which there may be several, which may be parallel or non-parallel provided a certain symmetry is observed in their arrangement. (Such a mechanism is disclosed in the French Patent No. 855,700.) One of the essential characteristics of the machine of the present invention is that whatever may be the circumstance of operation, whether normal or abnormal, this synchronizing mechanism does not transmit any appreciable fraction of the generated energy, that it is not subjected outside of its own inertia to any appreciable alternating forces, that it supports in its operation only the same static loads as when it is at rest, except for small differences which it is impossible to avoid between the passive resistances (such as above referred to), and that it does not transmit any appreciable reciprocating force to the frame. One of the means utilized for obtaining these results, outside of the arrangement set forth above, consists in connecting the two mobile groups to their suspension shafts in such a way that the arms of the levers of these suspensions are inversely proportional to the respective masses of the corresponding mobile groups.

Finally permanence, symmetry and regularity of operation are obtained by utilizing always a minimum of two sets of engine cylinders, each cylinder having therein two pistons and in providing between the two movable groups constituted respectively by pistons connected to move together a proper distribution of the engine elements and of the resistant elements. Under these conditions a power impulse occurs at each stroke of the engine and it is no longer necessary to utilize any system (such as pneumatic cushions) for recuperation of energy not directly useful for the production of compressed gas, for the purpose of returning the movable elements after each power impulse. If in certain particular cases it may be of advantage to utilize such recuperating and equalizing means, this will be done for the purpose of assuring, for example, security for certain accidental operations but not for maintaining the regular operation of the machine.

The present invention has as a further object a free piston machine composed of a number of such engines with double pistons, the pistons in different cylinders of these engines being connected together by rigid mechanical connections without jointed articulation and disposed in such a manner that their axes are parallel and that their dead centers are centrally situated in the same plane or in planes more or less adjacent to each other, this plane or these planes being perpendicular to the common direction of the axes. Moreover, these engines are grouped in such a way that in the composite machine a power impulse is provided at each stroke.

All the axes of the engine cylinders of these machines may be uniformly distributed on a circle about a common central axis. The cylinders are then divided into two sets, alternate cylinders of these engines being in the respective sets. One set performs its power stroke while the other performs its compression stroke and vice versa.

In each set all the pistons disposed at the same side along the common central axis from a median dead point are connected rigidly between themselves and are connected rigidly with the pistons of the other set which are on the opposite side of the dead point along the common central axis, so as to be out of phase by one stroke in relation thereto.

Each group of pistons thus constituted may be connected in the usual manner with a certain number of compression pistons (or of compressor cylinders in the case of movable cylinders).

The invention in this further aspect thereof may find particular application to the apparatus of the French Patent No. 855,700 of February 1, 1939, of Ernest Mercier above referred to. It will be understood that all elements comprised in each of the two movable assemblies have in the other movable assembly a corresponding element geometrically identical and subjected in the opposite direction to precisely the same pressure at each moment whether in normal or abnormal operation.

In another aspect the invention provides a free piston machine in which a plurality of pistons are arranged in a cylinder for reciprocating movement therein along the axis of the cylinder. Alternate pistons in this cylinder are connected to move together in the reciprocating movement thereof so that one piston or set of pistons may move as a unit in the opposite direction to the movement in the cylinder of the other pistons. In accordance with this aspect of the invention a fluid or gas introduced between adjacent pistons of the cylinder may serve by its pressure or expansion or both to produce the movement of these pistons oppositely to each other, or the fluid or gas may be acted upon, for example, in the compression of air, when the pistons are driven by a prime mover in opposite directions. With the aid of suitable valve mechanism associated with each cylinder the fluid or gas may be introduced between the pistons at the proper points in their travel relative to each other and exhausted therefrom to produce a power stroke or a compression stroke of the pistons as prime movers, or these pistons may act in the cylinder as a double acting gas compressor.

The invention, of course, may take a large number of forms some of which will be described by way of example in connection with the accompanying drawings in which:

Figs. 1 and 2, respectively, are diagrammatic views in longitudinal section of two forms of internal combustion engine and compressor assemblies embodying certain of the broader principles of the invention.

Figs. 4 and 5 are longitudinal sections of a further modified form of the invention showing the machine in two extreme positions.

Fig. 6 is a diagrammatic view from the end of a six-cylinder machine which otherwise may conform to the structure of either Fig. 4 or Fig. 5.

Fig. 7 is a diagrammatic view showing still another disposition of the firing cylinders of the internal combustion engine assembly.

Fig. 8 is a view in longitudinal section of another modification of the invention.

Fig. 9 shows two transverse half sections taken respectively along lines A—A and B—B of Fig. 3.

Fig. 10 is a partial view in longitudinal section of a modification of a compressor cylinder similar to those of Fig. 3.

Figure 1:
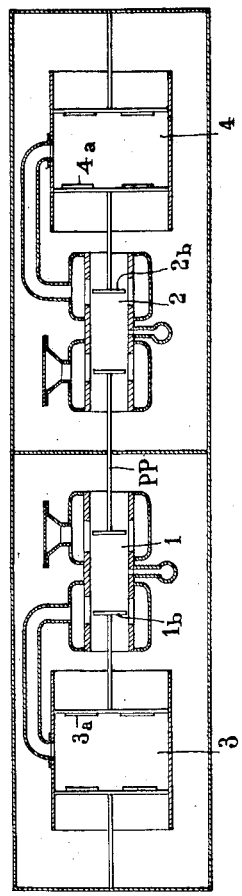

In the drawings, which are merely illustrative of the invention, we disclose a form of power plant designed to promote economy of space and fuel consumption. A characteristic feature of such power plant resides in the arrangement whereby the movable parts of the air compressors are connected for coordinated movement with the moving parts of the power and gas generating units, and in the grouping of these units into two opposing sets to permit imparting staggered strokes to the pistons of the two sets.

Figure 2:
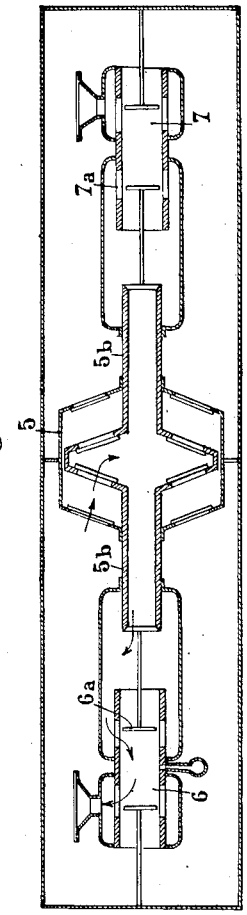

There are various ways of accomplishing this. For example, Fig. 1 shows a type wherein a pair of open-ended engine cylinders 1 and 2 and a pair of compressors 3 and 4 are arranged along one and the same axis with the two coaxial engine cylinders disposed adjacent to one another. A double piston PP is mounted for reciprocation in the adjacent ends of the cylinders and cooperates with pistons 1b and 2b in defining the combustion chambers of the respective cylinders. The pistons 1b and 2b are respectively connected with pistons 3a and 4a and reciprocate the latter in their respective compressor cylinders which are arranged respectively at the outer ends of the engine cylinders. Fig. 2 shows a double acting compressor unit 5 which occupies the central position occupied by the adjacent engine cylinders in Fig. 1. The double-acting piston 5a of the compressor has hollow extensions 5b extending on each side of the piston toward the cylinders 6 and 7 and these extensions are connected to pistons 6a and 7a disposed in the cylinders.

Figure 3:
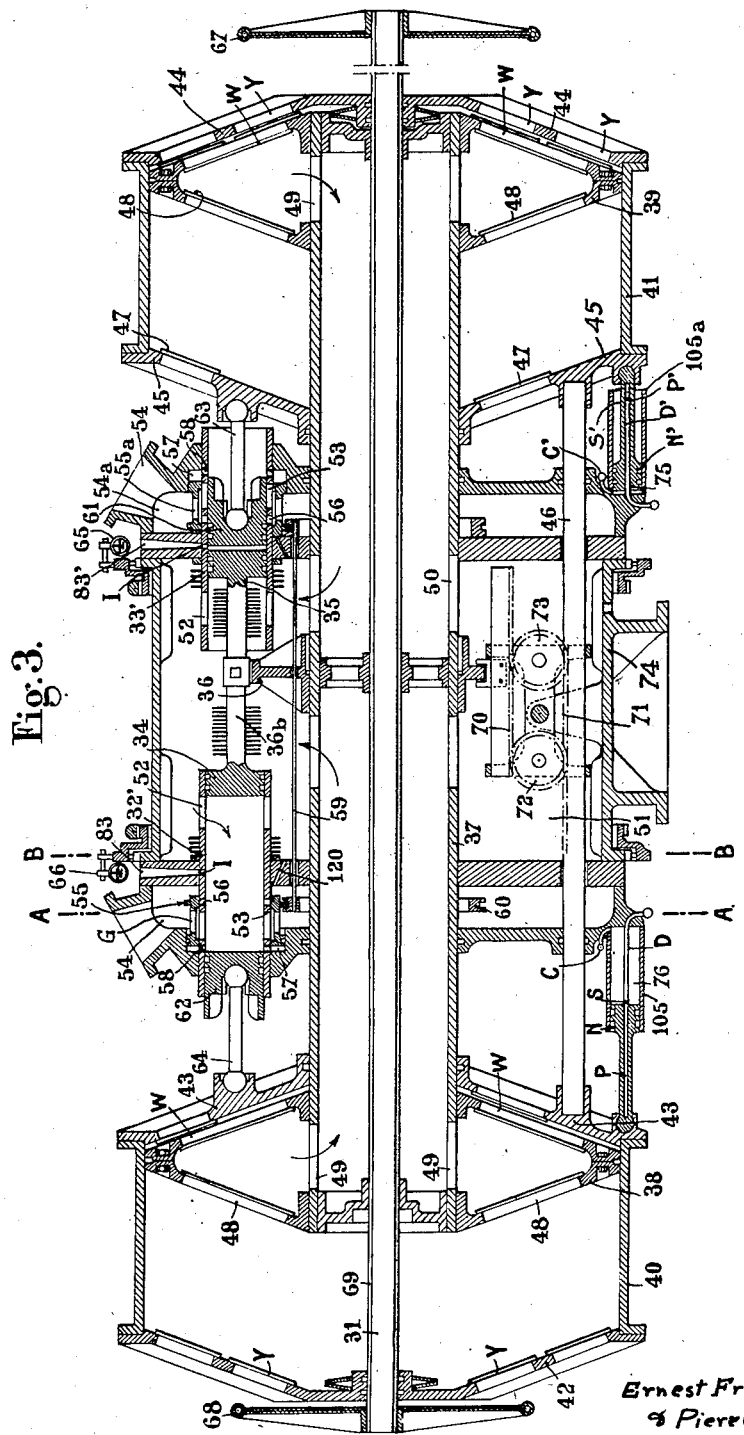
Fig. 3 is a longitudinal section of an internal combustion engine compressor assembly of modified form embodying the invention.

Figure 3 shows a pair of double acting compressor cylinders 40 and 41 arranged in spaced relation and mounted for movement axially as a unit. Combined therewith are two sets of engine or motor cylinders 32' and 33', only one cylinder of each set being shown in Figure 3, the sets being arranged in opposed relation with the cylinders distributed around the longitudinal axis of the compressor intermediate the compressor cylinders and cooperating with pistons 34, 35, 61 and 62 reciprocating within the ends thereof to form firing chambers.

Figure 4 shows a plurality of internal combustion cylinders, arranged about a common central axis and all of which have their pistons connected so as to actuate a double acting compressor, located laterally of the cylinders on the central axis.

The difference between the disclosures of Figures 3 and 4 is this: In Figure 3, there are compressor cylinders at each end of the machine with intervening motor cylinders arranged in two sets, each set being a distinct circular series, while in Figure 4 there is but one compressor at one end of the machine and only one circular series of motor cylinders is provided. The difference goes further. In Figure 3, one circular set of motor cylinders has in each cylinder two oppositely stroking pistons with one piston of a cylinder of one set in coaxial alignment with the piston of a cylinder of the second set—this arrangement being true of the succeeding pairs of aligned cylinders in the various positions cirumferentially in these two sets. But in Figure 4, one half of the total number of cylinders of the series, that is, the alternate cylinders, as a circular set of motor cylinders have their pistons stroking in opposing directions with reference to the pistons of the remaining half of the cylinders as another set. The reason for this will be explained hereinafter.

Figure 8 discloses a still further departure from the foregoing in that, while it shows the same disposition of motor cylinders as Figure 4, there are two coaxial sets of compressor assemblies cooperating therewith instead of one. The advantage of division of the power between the motor cylinders thus obtained finds particular application to diesel engines in which the ignition speed of the fuel atomized is limited so that large bulky cylinders cannot be used.

In Figures 4 and 5, the series of motor cylinders as above stated is arranged into two sets, one set alternating with respect to the other set. In Figure 7, this arrangement is shown diagrammatically where it will be seen that one group of cylinders $C^1$, $C^2$, $C^3$, etc. is disposed in alternate relation between another group $C1$, $C2$, and $C3$, all of the cylinders being arranged in a circle so that the various cylinders making up the two internal combustion engines are situated in a plane perpendicular to the direction of the common axis of such engines. Each cylinder has a pair of oppositely arranged pistons which are unconnected to each other and are adapted to reciprocate in the open ends of the cylinder. Six engine cylinders are contemplated in Figures 4 and 5 and are shown diagrammatically in Figure 6, where one set of cylinders, three in number designated 1 are disposed in alternate relationship with respect to the other set 2, the entire series being arranged around and concentrically of the tubular piston rod 9 which serves as a compressed air conduit to feed the cylinders with compressed air.

It is proposed to give the pistons operating in the cylinders of one set a staggered stroke with respect to those operating in the cylinders of the other set so that while the pistons of one set perform their power stroke the pistons of the other set will perform their compression stroke, and vice versa.

The arrangement is such that all the pistons which are at one and the same end of their cylinders in set 1 as part of a first group of pistons are constrained to move in a direction counter to all the pistons as part of another group which are at the same end of their cylinders as the first group but which are in set 2 of the cylinders. This is also true of the other pistons which are disposed at the other end of the foregoing two sets 1 and 2 of cylinders. The pistons of the first group which operate in set 1 of the cylinders are connected to the pistons at the other end which operate in the other set of cylinders to form two groups of pistons which move as units in opposite directions. In Figures 4 and 5, when the oppositely arranged pistons 3' and 4' which are in the cylinders of set 2, for example, are completely within their respective cylinders, as shown, after having completed their compression stroke, the oppositely arranged pistons 3 and 4 of the cylinders of set 1 are projected beyond the opposing ends of their cylinders, having completed their expansion stroke. In other words, pistons 3' and 4' disposed in a given one of the cylinders, respectively move in one and the same direction as pistons 4 and 3 disposed in the alternate cylinders, that is, the cylinders of the other set, at the opposite ends thereof. Hence when pistons 4 and 3, of a cylinder of set 1 follow their compression stroke, pistons 4' and 3' of the cylinder of set 2 follow their expension stroke, their being one power impulse for each stroke. It will be apparent that each of the pistons 3' in relation to each of the pistons 4 is offset along as well as transversely of the common axis and that piston 3' is connected to piston 4 in the same group therewith to move therewith in reciprocating movement as a unit. Similarly offset pistons 3 and 4' also are connected to form a group moving as a unit in opposition to the first unit.

The means cooperating with these pistons to impart the foregoing movements comprises the movable parts of the compressor device and their connections. The engine cylinders in Figs. 4 and 5 are fixed in position and project through a closed annular fluid admission jacket 15. Slidably projecting concentrically in said jacket is a tubular conduit 9 which serves as a piston rod. The six engine cylinders are coupled to a single compressor to provide a unitary generator, the circle described by the engine cylinders being preferably of a diameter less than that of the compressor cylinder 14.

The compressor cylinder 14, Figs. 4 and 5, is positioned concentrically of the tubular piston rod or conduit 9 by means of disks or cylinderheads 10 and 10' which close opposite ends of this cylinder and which slidably engage tubular piston rod 9. A hollow piston 11 is carried by tube 9 short of one end and traverses snugly in the compressor cylinder 14. A series of vent ports A is formed in one disk 10 and another series B formed in the other disk 10'. Check valves C control vents A and check valves D control vents B. In hollow piston 11 on one wall are check-valve controlled vents E and on the other wall are check-valve controlled vents F. This hollow piston communicates with bore of tube 9 by means of a port 12, and tube 9 communicates with jacket 15 by means of ports 13.

A yoke or saddle piece 8 encircling tube 9 has pivotal connections with three pistons 4' of one group of pistons which are on the same side, left side in Figs. 4 and 5, of jacket 15, lengthwise of the common axis, these three pistons 4 being connected together rigidly peripherally of said jacket and being connected by connecting rod 5' to the end wall 10 of compressor cylinder 14. The pistons 4 of the other group of pistons which are on the same side of jacket 15 as pistons 4' are each pivotally connected to a yoke 6 carried by tube 9 at one end thereof.

The pistons 3' which are on the other side, right side in Figs. 4 and 5, of jacket 15 from the pistons 4' and which are in the same cylinders with pistons 4' are of the same group as the pistons 4 and are pivotally secured to a yoke 7 also fixed on tube 9 at a point intermediate its ends. The pistons 3 which are on the right side of jacket 15 and which are in the same cylinders as pistons 4 are of the same group as pistons 4' and are pivotally connected to the adjacent terminals of link rods 5 the opposite ends of which are secured to the end wall 10' of compressor cylinder 14 to which the pistons 4' are connected.

This construction of intercoupled engine and compressor assemblies assures that every element comprised in each of the two moving bodies or units has in the other moving body a corresponding element geometrically identical and subject (in the opposite direction) to exactly the same pressures, in normal or in abnormal operation. It is obvious that, if desired, the median planes of all the engines, instead of coinciding as in the example described in the preceding text, can be arranged parallel and in spaced relation, this requiring, however, lengthening of the machine.

The same underlying principle of construction can be adapted in connection with providing a two-stage compressor for feeding internal combustion cylinders with compressed air at a high pressure, say at a pressure from 8 to 10 kilograms. Such an arrangement of parts is shown in Figure 8, where provision also is made for cooling the air compressed in the compressor.

In Figure 8 the construction and arrangement of parts of the motor assembly is similar to what has already been described in connection with Figs. 4, 5 and 6, except that the reduced end 9a of the tube 9 that is surrounded concentrically by the two sets of cylinders is not formed for communicating directly with jacket 15. In the main length of tube 9 is fixedly positioned a cooler device for the air, the inlet and outlet water passages of which extend into reduced end 9a of this tube and slidably project through stuffing boxes located in the adjacent closed end 33 of this tube.

The compressor cylinder 16 of the low pressure stage is disposed concentrically of tube 9, being provided with check-valve controlled vents H. Slidably closing one end of this cylinder 16 is a hollow piston wall 18 carrying exhaust valves 27 controlling adjacent vents which communicate with the interior of a high pressure cylindrical chamber 17 between which and cylinder 16 is the annular cylindrical space 29. Chamber 17 is attached at one end to movable piston wall 18 and at its opposite end is attached to and closed by another hollow piston wall 19 also slidable in cylinder 16. The hollow space of first piston 18 communicates with the annular space 29 by means of ports 28, which annular space, in turn, communicates with pipes 24 which establish lines of flow of compressed fluid directly into the jacket 15.

Also slidably positioned in cylinder 16 is a piston 20 spaced a convenient distance from hollow piston 19 in fixed relationship thereto. It will be seen that connecting rods 5' which connect piston 18 to yoke 8 that operate pistons 4' is made of a length suitable to simultaneously interconnect the hollow pistons 18 and 19 as well as the solid piston 20 so all three pistons will move at the same time along tube 9, carrying cylindrical high pressure chamber 17 along with them.

Hollow piston wall 19 has vent ports 28 which communicate with the interior of the annular space 29. The wall 19 also carries exhaust valves 27 controlling ports that communicate through the hollow wall 19 and the ports 28 with the interior of the cylindrical jacket 17. This hollow piston wall 19 divides the high pressure from the low pressure zone of the multi-stage compressor. The hollow piston 21 of the low pressure zone is keyed onto tube 9 and makes a traverse between hollow piston 19 and solid piston 20, both slidable in cylinder 16. This hollow piston 21 has check valve controlled ports S' on one side wall and check valve controlled ports T on its opposite wall. Communication between hollow piston 21 and tube 9 is had by means of ports 26 formed in this tube 9 in a plane with said piston. A smaller hollow piston 22 is also keyed to tube 9 and has a traverse in cylindrical chamber 17. It has, on one wall, check valve controlled ports M' and on its opposite wall check valve controlled ports O, both sets of ports communicating with the interior of cylindrical chamber 17 respectively at opposite sides of piston 22. In the device just described, the pistons operate in two adjacent compartments, one being the high pressure chamber 17; one piston, 22, of the pair of pistons carried by tube 9 operating in the chamber 17, while the other piston, 21, operates in the low pressure compartment formed between the pistons 19 and 20. It will be seen that tube piston 21 slides relatively to and over connecting rod 5' which connects pistons 19 and 20.

In Figure 3 the compressor cylinders 40 and 41 are supported at their adjacent sides by the tube 37 which is arranged concentrically of a shaft 31 and is supported for sliding movement in the closed cylindrical jacket or air chamber 51. The tube 37 fixedly carries at one end a hollow piston 38 and a similarly fixed hollow piston 39 at the other end. Piston 38 is adapted to make a stroke in compressor cylinder 40 between oppositely inclined walls 42 and 43. Piston 39 similarly moves between the oppositely inclined walls 44 and 45 of cylinder 41. A rigid connecting rod 46 is attached at opposite ends to end walls 43 and 45, respectively of cylinders 40 and 41.

One wall of each piston 38, 39 carries pressure valves 48, while the other wall carries check valves W. The wall 42 of the cylinder 40 facing the valves 48 of piston 38 carries check valves Y while that wall 45 of cylinder 41 which faces valves 48 of piston 39 carries check valves 47. The hollow spaces of compressor pistons 38, 39 connect with the interior of tube 37 by means of passages 49 formed in tube 37 in a plane with the pistons. Tube 37 in turn communicates with the central chamber 51 by means of ports 50. Tube 37 carries fixed thereto centrally thereof a yoke 36 which supports at its lower part a horizontal rack 70 meshing with pinions 72 and 73 supported in fixed position by a suitable frame mounted on casing 74. Meshing with these pinions 72 and 73 is another rack 71 carried by the slidable connecting rod 46, which arrangement insures that when either rack moves in one direction it will rotate the pinions, causing these pinions in turn to move the other rack in a counter direction. The racks and pinions also give central support to the movable tube 37.

As previously mentioned, two series of firing cylinders are arranged in circular rows around tube 37, with the adjacent ends of the cylinders of the two rows projecting into the jacket 51 as shown in Figures 3 and 9. The cylinders of the two sets are disposed in horizontal, coaxial alignment with one another, two of such cylinders 32' and 33' being shown in Figure 3. A pair of oppositely movable pistons 62 and 34 move in cylinder 32' while a similar set designated 61 and 35 move in cylinder 33'. The pistons 62 and 61 at the opposite ends of the aligned cylinders are connected for linear movement to cylinder walls 43 and 45, respectively, of cylinders 40 and 41 by short links 64 and 63. The inner or adjacent pistons 34 and 35 moving in these same cylinders are connected together for joint movement by a common piston rod 36b to which is attached centrally the yoke 36, which in turn is secured to the tube 37.

It will thus be seen that in this construction of parts, provision is made for moving the compressor pistons carried by the central tube 37 in one direction of reciprocation in their encasing compressor cylinders, while, at the same time, means are provided for reciprocating these compressor cylinders relatively to the tube in a counterdirection. As a result the end walls of the cylinder behave as pistons in cooperating with the compressor pistons 38 and 39, moving towards or away from the pistons 38 and 39 associated with them, and regardless of the direction of reciprocation, compressing air in the spaces between the pistons and the compressor cylinder walls in that stage of the cycle when they are approaching one another. As the compression reaches the desire value determined by the setting of the valves 48 or W, as the case may be, the valves at the pressure side of the pistons open while the values at the opposite ends close, permitting the compressed air to pass through passage 49 into the tube 37 and thence through the openings 50 to the central chamber 51. As the tube 37 is moved back and forth concomitantly with movement of the pistons 34 and 35 the cylinders 40 and 41 are moved in the opposite direction to tube 37 in each stroke of said tube 37 by virtue of the movement imparted to the cylinders 40 and 41 through the short links 63 and 64 and the rigid connecting rod 46. It will be understood from the above description that in each such stroke, both of the tube 37 and the pistons 38 and 39 carried thereby and of the cylinders 40 and 41, a power impulse is given thereto produced by the combustion of the fuel alternately in the cylinders 32' and 33'.

At the center of the length of each cylinder 32', 33' as shown in Figure 3 is the inlet port I for the fluid fuel coming from the injector 83 or 83'. On opposite sides of each inlet port I along the length of each cylinder are ports 52 and 53 defining admission and exhaust passages, respectively, for reception of compressed air and for exhausting the combustion gases. Between the exhaust ports 53 and the injector inlet ports I are relatively restricted supplementary or auxiliary exhaust ports 56. A pair of valvular sleeves 55 and 55a, mounted for limited sliding movement along the cylinders 32' and 33', serve respectively to control the covering and uncovering of the ports 56 of both cylinders in synchronism with the movement of the pistons. The inner parts of these sleeves move, piston-like, in annular chambers 57 surrounding the cylinders and bored out of the adjacent cylinder frames, the latter being provided with exhaust outlets 54 and 54a with which the exhaust passages 53 and ports 56 communicate. The two sleeves 55 and 55a are coupled together for conjoint movement by a tie rod 59. It will be seen that when the tube compressor pistons 38 and 39 are positioned, as shown in Figure 3, their greatest distance apart from the walls 42 and 45 of compressor cylinders 40 and 41, pistons 35 and 61 in cylinder 33' will be positioned in close proximity at the center thereof, while pistons 62 and 34 in cylinder 32' will be separated their greatest distance apart.

Similarly in Figures 5 and 8, pistons 2, 4 in one cylinder there shown will be positioned in close proximity, while pistons 3' and 4' of the other cylinder shown will be separated their greatest distance apart. In these figures the valves or valvular sleeves which control the admission of fluid to as well as exhaust of fluid from the cylinders may be synchronously operated by any desirable means, not shown.

Supplying the cylinders shown in Figure 3 with hot fuel gases or other fluid fuel is done by any desirable means as is also regulation of the intervals of injection. As one way to accomplish this function we disclose a hydraulically operated mechanism for actuating an injector or injectors which feed hot fuel gases into the firing cylinders.

Two injectors 83 and 83' are provided for the two cylinders shown in Figure 3. Poppet valves 81a, Figure 9, are controlled in the conventional way by springs (not shown). When poppet valve 81a is closed, pistons 62 and 34, Figure 3, have been completing their expansion stroke, while a similar poppet valve has opened to admit hot gases in order to impel pistons 35 and 61 outwardly in a corresponding expansion stroke. A pair of rack rings of which 81c is shown in Figure 9 are operably mounted for oscillatory movement around cylindrical jacket 51. An accurate series of teeth M are formed peripherally of each ring. Adapted to mesh with the teeth on the rings are rack-bars 86 each attached to an actuating piston 87 operating in cylinder 87a. Rocker arm 84 is pivoted so as to present a roller 81d opposite each of rings 81c. The outer end of the rocker engages the outer end of the poppet valve 81a which controls the flow of fluid fuel through the injector. A similar arrangement is provided in connection with the injector 83'.

Fixedly disposed at the opposite ends of jacket 51, Figure 3, are a pair of cylinders 105 and 105a in which operate pistons N and N' having tubular piston rods P and P' closed at their points of attachment to the adjacent walls 43 and 45 respectively of compressor cylinders 40 and 41 respectively. There are fixed tubes D, D' extending each concentrically in each cylinder 105 and 105a over which each piston N, N' with its tubular piston rod P, P' slides as it moves in its enclosing cylinder. The tubes D, D' extend beyond these cylinders, tube D connecting by pipe 93 with a sump 92, Figure 9, while tube D' connects with another similar sump. A pipe C connects the inner end of cylinder 105 with cylinder 87a, Figure 9, while pipe C' connects inner end of cylinder 105a with cylinder similar to cylinder 87a. Pipe C also connects with a pump 91 which connects by pipe 91' to an accumulator cylinder 90, while pump 91 has a pipe 92' which connects it to sump 92. Similarly pipe C' has the connection to a pump, which pump has a pipe extending from a sump and also a pipe which connects to an accumulator cylinder.

Oil or any other suitable fluid fills each cylinder 105, 105a, but not at the same time. In Figure 3 at S is shown a port in tube D, just in advance of the final outer position in which piston N has moved; similarly tube D' in cylinder 105a has a port S in the same relative position. When the pistons N, N' are in the positions shown in Figure 3, piston N' and its tubular piston rod P' are encased by cylinder 105a and there is no oil in this cylinder. In cylinder 87a piston 87, Figure 9, is in down position when piston N is in the position at the left in cylinder 105, Figure 3, and the piston corresponding to piston 87 for the injector 83' is at the top end of its cylinder.

It may be desirable to cushion the hollow pistons 38 and 39 as they reach the end of their stroke in the compressor cylinders in either direction. In Figure 10 are disclosed the details. An annular flange 98' extends outwardly from the wall 96 of the compressor cylinder 40 and cooperates with an inner spaced concentric band H' in defining an annular chamber 97 closed at its outer end but communicating at its inner end with the interior of the compressor cylinder 40. There is a piston 98 movable in this chamber 97, the latter being reduced in width where it opens out into cylinder 40 and in this restricted annular orifice moves a flange 98a formed on piston 98. A compression chamber 99 is provided between piston 98 and the wall 96 of cylinder 40. Check valves Y are carried by this wall. The band H' is formed with a series of ports 100 which communicate with compression chamber 99.

We will now describe the operation of the machine, in all of its varied forms.

Referring to Figure 4, the compressed air delivered by tube 9 from the compressor cylinder 14 is further compressed in the space between inwardly-moved pistons 4' and 3' and reacts now, for example, by injection of the fuel under influence of the increased pressure, to move these pistons outwardly, and in doing so piston 3' moves to the right outwardly carrying yoke 7 with it, hence moving tube 9 to the right as shown in Figure 5, and as this tubes moves to the right it acts through the yoke 6 to move piston 4 inwardly of its cylinder towards the right. But piston 4' is also moved outwardly of its cylinder towards the left, and as it moves, carries yoke 8 along with it, thus causing compressor cylinder 14 to move to the left, hence causing piston 3 to move towards the left inwardly of its cylinder. Pistons 3', 4' thus are making an expansion stroke while pistons 3, 4 are making a compression stroke. As pistons 3', 4' expand compressed air is drawn in as indicated by the arrows, into admission ports T which have been opened by appropriate mechanism for this purpose. As pistons 3, 4 move towards each other, these admission ports T close. As the pistons reach the end of their expansion stroke the fluid is exhausted out of ports U.

As tube 9 moves to the right and cylinder 14 moves towards the left, hollow piston 11 carried by tube 9 and end wall 10 carried by cylinder 14 move away from each other, while piston 11 and end wall 10' move towards each other. In moving to the right air is being sucked in through the ports A controlled by valves C, which valves have opened because there is a suction being created in cylinder 14 between wall 10 and piston 11. This is shown by arrows in Figure 5. The suction has closed valves E on piston 11, but inasmuch as piston 11 is compressing air in cooperation with wall 10' as they approach, the valves D thereby being closed, valves F in piston 11 are opened so the air is forced into hollow piston 11 and injected by way of ports 12 into tube 9 and thence it passes by way of ports 13 into jacket 15 and may be led off for any desired use. The valves C and F which opened during this stroke of piston 11 to the right, close when this piston moves in a counter direction shown in Figure 4, while the previously closed valves D and E are now open, and as pistons 10 and 11 are now compressing air, the latter enters into hollow piston 11 again and is injected through tube 9 into the jacket by the means just now set forth. The action of the movable parts of this compressor is thus double-acting.

Now the result of the movement of these parts is to stagger the strokes of the pairs of double pistons contained in the cylinders shown in Figures 4 and 5, which are arranged oppositely to each other. This is also true of the pistons shown in Figure 8. In this figure the compressed air delivered out of the compound high and low pressure compressor is cooled by the coils of radiator 23 where it passes through tube 9 enroute to the motor cylinders.

In Figure 8, the direction of movement of the mobile parts is as follows: pistons 18, 19 and 20 together with cylinder 17 are just completing their movement towards the left, while the two pistons 21 and 22 attached to tube 9 are completing their movement towards the right. In doing so pistons 21 and 20 compress air, closing intake valves H in cylinder 16' at the right of piston 21 until piston 21 has passed thereby, opening valves S' and closing valves T in hollow piston 21, causing compressed air to flow by way of ports 26 out of piston 21 into tube 9 to be cooled by radiator 23 on its way out to ports T' and thence into small hollow piston 22. Pistons 21 and 19 during this stroke are separating so atmospheric air enters as valves H open after these pistons have passed thereover, this being the admission stroke in the low pressure area. As this takes place pistons 18 and 22 are also separating, as pistons 22 and 19 approach and are compressing air in cylinder 17, so a suction is created between pistons 18 and 22, and the compressed air in hollow piston 22 which came from hollow piston 21 rushes out of piston 22, unseating check valves M' and enters chamber 17, this being the admission stroke in the high pressure section or stage, valves 27 in piston 18 closing at this time. Moreover, as pistons 22 and 19 approach, the air they compress causes valves O in hollow piston 22 to close, so this compressed air is forced out of chamber 17 through ports controlled by valves 27 in hollow piston 19, as the latter have been forced open by the air pressure. The compressed air is now driven out of hollow piston 19 through ports 28 into the annular space 29 surrounding chamber or cylinder 17, and out through delivery pipes 24 into jacket 15 for feeding the engine cylinders and also for any other useful purpose requiring compressed gas.

During the reverse strokes of the compressor cylinder pistons and the tube pistons those valves previously open are closed and those previously closed are open, so now the air ultimately increased in compressive power when compressed in chamber 17, will be driven out through the vents controlled by check valves 27 in hollow piston 18, which valves are open for this purpose; hence the compressed air will be forced out of vents 28 into the annular space 29 and thence out of delivery pipes 24 to the jacket 15 for further supplying the engine cylinders.

The operation of the power plant shown in Figure 3 where the two circular groups of engine cylinders are arranged in parallel relation instead of in staggered relation as in Figures 4 and 8 will now be explained.

Injection of hot combustible gases or other fluid fuel will take place in the narrow combustion chamber between the closely contiguous ends of the pistons 35 and 61 (see Figure 3). When these parts are thus positioned, pistons 62, 34 have reached the limit of their expansion stroke, the cam 85 (Figure 9) on oscillating ring 81c associated with injection 83 has receded from a position under the roller 81d of rocker 84, while the similar cam of the other oscillating ring associated with injector 83' has engages the roller of the rocker, and during the movement of this cam the rocker has been tilted, causing the poppet valve in injector 83' to be pressed open, thereby admitting hot gases into the combustion chamber between pistons 35 and 61. At this time poppet valve 81a in injector 83 is closed under influence of its spring (not shown).

It will be seen that rack bar 86 meshing with teeth on ring 81c has oscillated this ring in a direction to move cam 85 out of the range of rocker 84, by moving downwardly in cylinder 87a, which action results when piston 87 on this rack bar ejects the oil or other fluid out of this cylinder into pipe C as it is drawn into cylinder 105 as piston N therein moves toward its extreme left-hand position, Figure 3. Although the pump 91 keeps up a constant circulation of this oil or fluid in all the parts where same is needed, the excess oil delivered through pipe C is returned to the sump 92 through port S into pipes D and 93.

While this is taking place, and as compressor cylinder 41 also moves towards the left, piston N' in cylinder 105a has moved to its extreme left end position in this cylinder, thereby closing port S' in pipe D' and ejecting the oil or other fluid out of cylinder 105a into pipe C' by which it is conducted into the cylinder similar to cylinder 87a, causing this oil as it rises in this cylinder to lift the piston operating therein, with the aid of the pump pressure, so that the ring similar to 81c for the right-hand injector 83', Figure 3, causes its cam 85 to engage and trip its rocker arm 84 into poppet valve opening position.

As hot fluid fuel is introduced into the firing or combustion chamber of cylinder 33', Figure 3, and there intermingled with the highly compressed air concomitantly introduced from the air compressors the fuel ignites and the resulting combustion gases exert a strong expansive force, thereby driving pistons 35 and 61 in opposite directions from the center towards the ends of this cylinder. Fins on the cylinder and on piston connector 36b (see Fig. 3) tend to radiate some of the heat from these cylinders into the compressed air atmosphere in the chamber 51. As these pistons separate, piston 61 impels link 63, causing it to move compressor cylinder 41 to the right in Figure 3 and as this cylinder moves, the connecting rod 46, Figure 3, pulls the other cylinder 40 in the same direction to the right. Connecting rod 46 carries the rack bar 71 which meshes with pinions 72 and 73 rotating on fixed axes so these pinions are turned counterclockwise, and as these pinions mesh also with rack bar 70 carried by tube 37, this rack bar is moved in the opposite direction, to the left as shown in Figure 3, thereby insuring synchronous movement of tube 37 in the same direction towards the left. However, the main propulsive force for causing this movement is coordinately produced by the piston rod 36b, since it is impelled towards the left by piston 35 as it moves outwardly and away from piston 61 in the firing or expansion stroke. As previously noted the piston rod 36b is connected to the yoke 36 which is connected in turn to the tube 37 carrying the hollow compressor pistons 38 and 39. The yoke also carries the rack bar 70 which, being responsive to forces imparted through the yoke 36 or through the pinions 72 and 73, insures that the relative movements of the tube 37 and the connected compressor cylinders 40 and 41 will be coordinated and synchronous.

It will be seen from Figure 3 that, before injection of fluid fuel occurs between contiguous pistons 35 and 61, the ports 58 of their cylinder 33' are exposed for communication with air chamber 57 through the interior of this cylinder at the rear of the advanced piston, these ports having just been uncovered by piston 61. As a consequence air at the pressure of the surrounding atmosphere will fill the space 57. The quick outwardly-directed movement of this piston 61, when expansion of the gases takes place, first closes the ports 58 and then successively uncovers the ports 56 and 53, and finally reopens the ports 58 as the piston 61 moves to the extreme right to a position corresponding to that of piston 62 in Figure 3. When the extreme position is reached, gases at the relatively high pressure obtaining in the firing chamber will pass into the space 57 causing the valvular members 55, 55a to slide lengthwise of the cylinders. In Figure 3 of the drawing the members 55, 55a are shown in the positions assumed by them at the end of the previous firing or expansion stroke of the pistons 35, 61 and which position is maintained until these pistons have reached the limit of their compression stroke and the ports 58 have been again exposed, that at the right communicating with the surrounding atmosphere and that at the left communicating with the firing chamber of cylinder 32'. Owing to the difference in pressure of the atmosphere and the gases in the firing chamber of cylinder 32', as the ports are uncovered and high pressure gases pass into the space 57 behind the valve 55 at the left of Figure 3, they will urge the valves 55 and 55a, which are tied together by the link 59, to the right, thus establishing an outlet of the gases from the firing chamber of the cylinder 32' through port 56 and the opening G in valve 55 to the discharge passage 54.

As the piston 61 moves sufficiently to the right to open the ports 53, the opposing piston 35 moves correspondingly to the left and eventually the piston 35 uncovers the air inlet ports 52. It will be observed, however, that the ports 52 and 53 are relatively so positioned with respect to the distances travelled by the opposing pistons that the discharge ports 53 will have partially opened before the air inlet ports 52 begin to become uncovered. This will insure that part of the combustion gases developed in the firing step shall have been permitted to discharge to the exhaust chamber 54 and that the pressure of the remaining gases will have been greatly reduced before the air inlet ports are opened and compressed air from chamber 51 is permitted to pass into the cylinder through the ports 52. During the part of the outward stroke of the pistons 61 after the ports 53 and 53 have been uncovered and until the piston approaches the extreme end of its stroke, the combustion gases are permitted to pass outwardly from the firing chamber through both the supplementary ports 56 and the main discharge ports 53 and during the latter part of this intermediate part of the stroke after the air inlet ports 52 have been uncovered, compressed air from the chamber 51 will flow into the firing chamber displacing the combustion gases and thus perform the necessary scavenging operation. When the piston 61 passes to the end of the expansion stroke it finally uncovers the previously covered port 58. At this instant, the corresponding port 58 at the left of the cylinder 32' will be uncovered by the piston 62 which is travelling to the right and thus the gases previously confined in the space 57 behind the valve 55 will be permitted to escape until atmospheric pressure is attained therein. At the same time gases at the pressure obtaining within the firing chamber of the cylinder 33' will enter the space 57 at the rear of the valve 55a and cause the latter to shift to the left, carrying with it the valve 55. In this way communication is established through the supplementary port 56 and the passage G in the valve 55a and this passage will remain open until the pistons 35 and 61 have been brought to the limit of their compression stroke, as shown in Figure 3, whereupon the valves 55 and 55a will be reciprocated to the right.

It should be borne in mind that just after sleeve 55 has thus been moved to the right, due to the uncovering of the port 58 and entry of compressed gases into space 57, piston 62 in cylinder 32' is moving to the right. As piston 61 also is moving toward the right in cylinder 33' and is covering ports 58 thereof, piston 62 in cylinder 32' covers progressively ports 58 and exhaust ports 53 and 56, and at the same time piston 34 of the same cylinder is approaching piston 62, and is covering air admission ports 52 of this cylinder. During the portion of the compression stroke before the piston 34 completely closes the air inlet ports 52, compressed air supplied by the compressor cylinders to the chamber 51 will enter through the ports 52, sweep through the cylinder and out through the discharge ports 53, thereby exerting a cooling effect on the cylinder walls and the pistons. After the piston 62 completely closes exhaust ports 53 some of the compressed air previously admitted into cylinder 32' through ports 52, and which is being compressed by the approaching pistons 62 and 34, is still free to emerge out of open ports 56, openings G in sleeve 55 and discharge chamber 54 to the inlet connections of a turbine or other prime mover. As a result, all of the admitted air which would otherwise be subjected to a full compression stroke of the approaching pistons 62 and 34 and confined between them, is not allowed to be compressed and retained in the firing chamber. Accordingly while these pistons in cylinder 32' make a full expansion stroke, they make a restricted compression stroke in the sense that the amount of compressed air retained to partake in the firing of the fuel charge is reduced, and, therefore, the degree of heat that would otherwise be developed in the compression stroke is reduced.

The same operation and effect of the pistons 62 and 34 are undergone by pistons 35 and 61 of cylinder 33' when their turn comes to make a compression stroke. In the latter event sleeve 55 will be restored, by means of the instrumentalities set forth, to the position it occupies in Figure 3, because, as pistons 62 and 34 approach the limits of their compression stroke and piston 62 passes port 58 of cylinder 32', gas under pressure in the chamber 57 at the left with which the port 58 registers is exhausted to atmosphere, thus causing sleeve 55 to be moved back into chamber 57 to the left. As this takes place connecting rod 59, in moving to the left pulls sleeve 55a in cylinder 33' to the left to the position it has in Figure 3.

As the compressor pistons 38 and 39 approach the compressor cylinder end walls which cooperate therewith the air between them is compressed and as the same pistons and walls of the compressor cylinders separate air is admitted between them. As these mobile elements are thus moving in the counterdirection, cylinder 40 is impelling piston N of cylinder 105 towards the right therein, while cylinder 41 is pulling piston N' of cylinder 105a also towards the right therein. Thus, while piston N is ejecting the oil out of its cylinder, by way of pipe C into cylinder 87a, piston N' is opening cylinder 105a for the admission of oil out of the cylinder corresponding to 87a. As the oil rises in cylinder 87a it raises piston 87 therein, hence elevating the rack bar 86, which in turn engages the teeth M of ring 81b and moves the ring upwardly, thus bringing cam 85 associated with this ring into the position shown in Figure 3 where it engages rocker 84, trips or tilts it, causing poppet valve 81a in injector 83 to open, just at the time pistons 62 and 34 of cylinder 32' have approached and define the constricted area or combustion chamber into which hot gases or other fluid fuel will be delivered from the injector. As this is taking place, and as piston N' moves to the right in cylinder 105a, the suction created in back of it, aided by pressure maintained by pump 91 induces oil to flow out of cylinder corresponding to 87a into cylinder 105a.

Figure 9 shows a pinion 107 mounted on a suitably supported rod or shaft 106, which shaft is associated with a torsional volute spring coiled around it (not shown) with the effect that when ring 81c has moved in one direction to retract its cam from engagement with its rocker 84, as a result of rack bar 86 of cylinder 87a meshing with the teeth of the rack associated therewith, the teeth M of this ring, meshing also with pinion 107 will rotate it in a direction operative to wind up or tension the volute spring engaging shaft 105 of this pinion. A similar arrangement is provided for the injector mechanism associated with cylinder 33', Figure 3. It follows that this particular rack bar, say rack bar 86 of cylinder 87a of Figure 9, when resistance against its piston 87 is progressively being diminished due to the oil being withdrawn out of cylinder 87a, is reacted upon by ring 81c which is impelled by pinion 107 to reverse its former direction of movement, because the torsional spring engaging its shaft 106 is now free to recoil and produce this reverse movement. Thereupon as ring 81c moves downwardly its teeth M, meshing with rack bar 86, impel this rack bar downwardly in cylinder 87a until it reaches the end of its movement in the bottom thereof as shown in Figure 9. In this way the oil is transferred from cylinder 87a to cylinder 105, and oil similarly is transferred out of cylinder 105a to the cylinder corresponding to cylinder 87a at the right-hand of Figure 3. Pistons 35 and 61 are now fully separated to the limit of their expansion stroke, and pistons 62 and 34 fully brought to the limit of their compression stroke, so now another cycle of the engine takes place in the manner already explained.

The compressed air of cylinders 40 and 41 in Figure 3 is driven out during the counter movements of these mobile assemblies by way of the ports 49 from within the hollow pistons 38 and 39 into tube 37 from which it emerges into feeding jacket 51. Under influence of compression of air between the pistons 38 or 39 and walls 42 or 45 of cylinder 40 or 41, as the case may be, valves 48 in pistons 38 and 39 open and discharge the compressed air, as just explained, into tube 37 while valves 47 remain closed. When the parts are moving in the direction toward the right of cylinders 40 and 41 in Figure 3, this action is reversed. Now piston 39 and the opposite wall 44 of cylinder 41, and piston 38 and opposite wall 43 of cylinder 40 are approaching to compress air. Thereupon valves W of the pistons 38 and 39, which were closed during the previous stroke just mentioned now open, while valves 48 of these pistons previously open now close. The compressed air is ejected out through the open ports 49, controlled by valves W and 48, into tube 37, thence being delivered to the firing cylinders.

It will be seen in Figure 3 that tube D has a leak or opening S so located that it will be uncovered by piston N of cylinder 105 when this piston is in its extreme left position in the cylinder. A similar opening S in the other tube D' is located in the same relative position in cylinder 105a as opening S is in cylinder 105, with relation to the piston N' of cylinder 105a when the latter piston occupies the same position in cylinder 105a that piston N is shown to occupy in its cylinder 105. But in the position of piston N' actually shown in Figure 3, opening S' of tube D' is closed by the tubular piston P' of such piston N', whereas opening S of tube D is uncovered by piston P.

It may sometimes happen that either of the tube pistons 38 or 39 will come dangerously close to colliding with a wall of either compressor cylinder 40 or 41. To prevent this shock absorbers are provided as an optional feature of this invention; also means are provided for the elimination of this hazard, of curtailing the pressures in the particular compressor cylinder in which the affected piston operates.

It should be noted that the suspension and synchronization members provided by the racks 71 and 70 and the pinions 72 and 73 are only designed to distribute the weight of the movable parts when the machine is subjected to accelerations parallel to its axis. When such accelerations cease to occur said members are stressed only by secondary forces that may occasion asymmetry in the functional gliding of the machine elements.

The constantly operated pump 91 associated with each hydraulic cylinder 105 or 105a is responsible for keeping the pressures in the coordinated cylinders, 105, 87a and 105a, 87b adequate to sustain normal as well as abnormal functioning of the machine shown in Figure 3. Reserve pressures are maintained in each of the fluid accumulators 90 for constantly making an adjustable contribution of extra fluid where needed, under influence of the operating pump 91, as well as of the regulator valve or cock 89.

The travel of the compressor cylinders, and consequent movements of the pistons N and 87, on the one hand and N' and 87' on the other hand is predetermined in accordance with definite pressure values, valve 89 controlling the adjustment of fluid pressures to meet such values, while pump 91 and accumulator 90 furnish the reserve pressure for this purpose. It follows that should the compressor cylinders and compressor pistons travel greater distances than they have been set in advance to traverse, an extra amount of liquid or oil will be forced into the appropriate one of the coordinated sets of cylinders as a result. Due to the presence of the safety ports S in the tubes D and D', when the compressor cylinders have stroked their utmost limits at either end of the machine, then that piston N or N', as the case may be, which has moved to its extreme left position in cylinder 105 will have uncovered ports S. Thereupon the increased amount of oil that is being distributed into space in front piston cylinder 105, is allowed to by-pass out of ports S through tube D so that part of this oil is free to discharge and return to the sump or tank 92 where it is picked up by the pump 91 and recirculated. This relieves the sudden augmentation of pressure due to inordinate feeding of oil into the unadjusted areas of the hydraulic cylinders. This compensation is automatic.

Where the shock absorbing device is used as shown in Figure 10 it operates as follows. When tube piston 38 is moving to the right in cylinder 40, while the cylinder is moving contraiwise, a suction is created which opens valves Y in this cylinder and air rushes into the cylinder 40 through the space within the annular ring H'. The air rushing through this space creates a suction in the pocket 99 connected by opening 100 with the said space provided by the ring H'. This suction pressure in the pocket 99 effects movement toward the right in Figure 10 of the member 98 having portions 98a projecting into the interior of the compressor cylinder 40. During the counterstroke toward the left of the piston 38, when the hazard exists that it might collide forcibly with cylinder head wall 96 of cylinder 40 when said head and piston 38 are approaching, it will be seen that air is compressed in the compression chamber between these movable parts, which action opens valves 48 of piston 38, but closes valves Y in wall 96 in this cylinder. As the piston 38 and the cylinder wall 96 approach each other, the piston comes into contact with the projections 98a of the member 98 and forces this member toward the left with respect to the annular ring H' and with respect to the extension hub 98' of the cylinder head wall 96. Air contained in the space 97 between the member 98 and the wall of extension hub 98' resists compression by the member 98. This acts as a cushion which absorbs the shock of this stroke of the movable approaching parts by slightly slowing them down.

It will be seen in Figure 9 that fuel injection chamber 82 therein shown may be made to connect with oppositely arranged firing cylinders, so that each single fuel injector 83 may feed two such cylinders at the same time. This device may, if desired, be replaced by other mechanical arrangements and especially by approximately calibrated springs lodged in recesses arranged in the thicknesses of the pistons or cylinder walls.

From the foregoing it will be clear that the arrangement made for the compressors of the machine is very compact; it reduces to a minimum the number of members to insure tightness, and on the other hand it secures perfect identity of the stresses by the gases on the homologous elements of the two moving bodies.

In connection with the aspect of the invention which relates to a machine of reciprocating type in which a plurality of pistons are arranged for reciprocation in a cylinder, alternate pistons being connected to move together in opposite directions with respect to other pistons in this cylinder, as will be apparent from the above description, in Figure 8, the pistons 20 and 19 are connected together by portions of the tie rods 5' which extend therebetween. The piston 21 which is carried by the central tube 9 is moved thereby relative to the pistons 20 and 19 between the position shown in Figure 8 and a position at the opposite end of the cylindrical space confined between the pistons 19 and 20 within the cylinder 16. It will be understood from the description above of Figure 8 that when the valves H, S' and T are suitably arranged and controlled relative to the movements of the pistons in the cylinder 16, the air may be compressed between the piston 20 and the piston 21 as these pistons move in opposite directions to each other to the positions shown in Figure 8. Similarly the air drawn into the space between the pistons 21 and 19 during this stroke will be compressed upon reverse movement of the pistons 21 and 19 relative to each other. As above described the valves are so arranged that the air thus compressed is delivered into the hollow piston 21 thence into the tube 9 through the ports 26.

It will be further noted in connection with Figure 8 that the piston 22, also carried upon the tube 9, similarly reciprocates oppositely to and between the pistons 19 and 18. Moreover, although the piston 22 operates in the cylinder 17 of smaller diameter than cylinder 16 the connection between the pistons 22 and 21 effected by tube 9 provides a similar relation of these pistons with respect to piston 19 as described above for the pistons 20 and 19 with respect to piston 21. The essential feature of the aspect of the invention being described thus is carried out for both the high and low pressure stages of the compressor. Pistons 20, 19 and 18, all being rigidly connected together in spaced relation by tie rod 5 and cylinder wall 17, move oppositely to and cooperate with the pistons 21 and 22 which are connected by the tube 9 to move together as a unit so that these pistons act on or are acted on by the fluid or gas between adjacent pistons.

It will be understood that although the invention in this aspect thereof has been disclosed for the structure of a compressor the same arrangement of the alternately connected pistons within a cylinder or cylinders for movement along the common axis thereof may serve as a prime mover when an expansible fluid is introduced under suitable control between the pistons which are adjacent to each other so as to move them in opposite directions with a power impulse concomitantly with exhaust or compression of the fluid at the opposite side of a piston which is intermediate between the two spaced and rigidly connected pistons cooperating with this intermediate piston.

We claim:

1. A fluid pressure machine of the reciprocating type comprising a plurality of sets of cylinders, each set having a plurality of cylinders distributed about and spaced from a common axis with the axes of the cylinders extending in the same general direction as the common axis, each cylinder having a piston operable therein in reciprocating relation thereto, the piston in a given cylinder of each set with respect to a piston in a cylinder of another set being offset both in said general direction and transversely of said general direction, and means connecting the piston of said given cylinder of each set to said piston of said cylinder of said other set which is offset with respect thereto to form groups of pistons, said pistons of each group move concomitantly respectively to decrease and increase the volume in said given cylinders while increasing and decreasing the volume in said other cylinders respectively.

2. A fluid pressure machine as defined in claim 1 which comprises a second fluid pressure machine cooperating with said first machine and having a cylinder connected to a given group of pistons of said first machine and a piston operating in said cylinder of said second machine and connected to another group of pistons of said first machine.

3. A machine as defined in claim 1 in which at least one set of said cylinders distributed about the common axis and the pistons operable therein are prime movers, a tube concentric with said common axis, a cylindrical shell concentric with said common axis and the cylinder of the low-pressure stage of an air compressor driven by said prime movers, a cylindrical shell concentric with said axis and the cylinder of the high pressure stage of the air compressor, compressor pistons moving in said shells and carried by said tube, and means for conveying the air from the low-pressure stage into the high-pressure stage through the central tube.

4. A fluid pressure machine comprising a plurality of sets of cylinders, each set having a plurality of cylinders distributed about and spaced from a common central axis with the axes of the cylinders extending in the same general direction as said common axis, each cylinder of each set having two pistons operable therein in opposite reciprocating relation to each other, a given piston in a selected cylinder of each set being operatively connected to and to move with the piston in a cylinder of a second set which is disposed at the opposite end of said second set cylinder lengthwise of said common axis with respect to said given piston in said selected cylinder, the other piston in said selected cylinder of each set being operatively connected to and to move with the other piston in said second set cylinder which is disposed at the opposite end of said second set cylinder from said piston therein which is connected to said given piston in said selected cylinder.

5. A fluid pressure machine as defined in claim 4 in which the axes of said cylinders are parallel to said common axis and said operative connections between said pistons in said selected and said second set cylinders provide for movement of translation parallel to said common axis of said connections and said pistons connected thereby.

6. A fluid pressure machine of the reciprocating piston type comprising a plurality of sets of cylinders, each set having a plurality of cylinders distributed about and spaced from a common central axis with the axes of the cylinders extending in the same general direction as the common axis, each cylinder in each set being disposed in offset relation transversely of said direction with respect to a cylinder of another set, each cylinder of each set having two pistons operable therein in opposite reciprocating relation to each other, a given piston in a selected cylinder of each set being operatively connected to and to move with the piston in a cylinder offset with respect thereto which is in a second set, said connected pistons being disposed at opposite ends lengthwise of said common axis in their respective cylinders, the other piston in said selected cylinder of each set being operatively connected to and to move with the other piston of said offset cylinder of said second set.

7. A fluid pressure machine of the reciprocating piston type comprising a plurality of sets of cylinders, each set having a plurality of cylinders distributed about and spaced from a common central axis with the axes of the cylinders extending in the same general direction as the common axis, each cylinder in each set being disposed in offset relation both in said general direction and transversely of said direction with respect to a cylinder of another set, said cylinder of said first set being in generally aligned relation to a cylinder of said other set, each cylinder of each set having two pistons operable therein in opposite reciprocating relation to each other, a given piston in a selected cylinder of each set being operatively connected to and to move with the piston in a cylinder offset with respect thereto which is in a second set, said connected pistons being disposed at opposite ends lengthwise of said common axis in their respective cylinders, the other piston in said selected cylinder of each set being operatively connected to and to move with the other piston of said offset cylinder of said second set.

8. A multi-cylinder fluid pressure machine comprising a plurality of sets of cylinders, each set having a plurality of cylinders distributed about and spaced from a common central axis with the axes of the cylinders parallel to said common axis, each cylinder of each set having two pistons operable therein in opposite reciprocating relation to each other, given pistons respectively in selected cylinders of each set being operatively connected together and to the pistons in cylinders of a second set which respectively are disposed at the opposite ends of said second set cylinders lengthwise of said common axis with respect to said given pistons in said selected cylinders so as to form a group of pistons movable as a unit in two directions of reciprocation concomitantly with reciprocating movement of said pistons in their respective cylinders, the other pistons respectively in said selected cylinders of each set being connected together and to the other pistons of said second set cylinders which are disposed at the opposite ends of said second set cylinders from said pistons therein which respectively are connected to said given pistons in said selected cylinders so as to form a second group of pistons movable as a unit in two directions of reciprocation concomitantly with reciprocating movement of said pistons in their respective cylinders.

9. A fluid pressure machine comprising a plurality of sets of cylinders, each set having a plurality of cylinders distributed about and spaced from a common central axis with the axes of the cylinders extending parallel to said common axis, each cylinder of each set having two pistons operable therein in opposite reciprocating relation to each other, a given piston of a selected cylinder of each set being operatively connected to and to move with the piston of a cylinder of a second set which is disposed at the opposite end of said second set cylinder lengthwise of said common axis with respect to said given piston of said selected cylinder, said piston in said second set cylinder being offset with respect to said given piston of said selected cylinder both in the direction parallel to said common axis and transversely of said direction, the other piston of said selected cylinder of each set being operatively connected to and to move with the other piston of said second set cylinder which is disposed at the opposite end of said second set cylinder from said piston therein which is connected to said given piston of said selected cylinder, said other piston in said selected cylinder being offset both in said direction parallel to said common axis and transversely of said direction with respect to said other piston of said second set cylinder to which it is operatively connected.

10. A fluid pressure machine as defined in claim 4 in which the cylinders of one set are located between the cylinders of the other set circumferentially about said common central axis.

11. A fluid pressure machine as defined in claim 4 which comprises a second fluid pressure machine having a cylinder connected to said given pistons in said selected cylinders and to the pistons of said second set cylinders operatively connected thereto to move in reciprocating movement therewith, and a piston operating in said cylinder of said second fluid pressure machine and operatively connected to said other pistons in said selected cylinders and to the pistons of said second set cylinders operatively connected thereto to move in reciprocating movement therewith oppositely to the movement of said cylinder of said second fluid pressure machine concomitantly with the opposite movement of said pistons of said first fluid pressure machine.

12. A machine as defined in claim 8 comprising means for rigidly interconnecting all the pistons belonging to each group and located at one side of a median plane transverse to the central axis to all the pistons belonging to the same group and located at the opposite side of said median plane.

13. A machine as claimed in claim 8 comprising a tube concentric with the central axis about which the cylinders are arranged, and means for securing to said tube all the pistons of one group located at one side of a median plane transverse to the central axis and all the pistons in the same group located at the other side of said median plane.

14. A machine as claimed in claim 8 comprising a tube concentric with the central axis about which the cylinders are arranged, said cylinders being prime mover cylinders, means for securing to said tube all the prime mover pistons of one group located at one side of a median plane transverse to the central axis and all the prime mover pistons of the same group located at the other side of said median plane, an air compressor having two relatively moving air compressor elements, and means for securing to such tube one of the two relatively moving elements of said compressor.

15. A machine as claimed in claim 8 comprising a tube concentric with the central axis about which the cylinders are arranged, said cylinders being prime mover cylinders, means for securing to said tube all the prime mover pistons of one group located at one side of a median plane transverse to the central axis and all the prime mover pistons of the same group located at the other side of said median plane, an air compressor having two relatively moving air compressing elements, and means for securing to said tube one of the two relatively moving elements of said compressor, said tube being adapted to convey the air delivered by the compressors to the prime movers.

16. A machine as defined in claim 1 in which at least one set of said cylinders distributed about the common axis and the pistons operable therein are prime movers, a tube concentric with said common axis, a cylindrical shell concentric with said common axis and serving as the cylinder of the low-pressure stage of an air compressor driven by said prime movers, a cylindrical shell concentric with said axis and serving as the cylinder of the high pressure stage of the air compressor, compressor pistons moving in said shells and carried by said tube, means for conveying the air from the low-pressure stage into the high-pressure stage through the central tube, and a cooler in said central tube for cooling the air passing therethrough.

17. A machine as defined in claim 1 in which at least one set of said cylinders distributed about the common axis and the pistons operable therein are prime movers, a tube concentric with said common axis, a cylindrical shell concentric with said common axis and serving as the cylinder of the low-pressure stage of an air compressor driven by said prime movers, a cylindrical shell concentric with said axis and serving as the cylinder of the high-pressure stage of the air compressor, compressor pistons moving in said shells and carried by said tube, means for conveying the air from the low-pressure stage into the high-pressure stage through the central tube, and means connected with said tube for feeding the prime movers with air conveyed through said tube from the high-pressure stage of said compressor.

18. A fluid pressure machine of the reciprocating type comprising a plurality of prime mover cylinders distributed about and spaced from a common axis with the axes of the cylinders extending in the same general direction as said common axis, said cylinders being arranged in at least two sets, each cylinder of one set being in axial alignment with a cylinder of another set, each cylinder having two pistons operable therein in reciprocating relation thereto, means connecting the adjacently disposed pistons of the two aligned cylinders for movement thereof together so that the piston in one cylinder moves respectively inwardly and outwardly of its cylinder upon outward and inward movement of said adjacent piston in the other aligned cylinder, and means connecting the outwardly disposed pistons of said aligned cylinders for movement thereof together so that the outwardly disposed piston in one cylinder moves respectively inwardly and outwardly of its cylinder upon outward and inward movement of said other outwardly disposed piston in its cylinder, and means operatively connected to said two groups of connected pistons and adapted to conform to the movements of said pistons as said adjacent pistons move respectively outwardly and inwardly of their respective cylinders concomitantly with movement of said outwardly disposed pistons outwardly and inwardly of the same cylinders.

19. A fluid pressure machine of the reciprocating type comprising at least two prime mover cylinders arranged with their axes extending in the same general direction and in opposed spaced relation in said direction, a pair of pistons in each cylinder reciprocatably movable therein axially thereof, means operatively connecting a piston of one cylinder with a piston of the other cylinder for concomitant reciprocating movement of said pistons axially in their respective cylinders, means operatively connecting the other pistons respectively in said cylinders for concomitant reciprocating movement of said other pistons axially in their respective cylinders, means for introducing a fluid under pressure between the pistons of the respective pairs of pistons to produce reciprocating movements of said pistons of said pairs in opposite direction in relation to each other, whereby upon movement of said first connected pistons in a given direction in their respective cylinders movement of said other connected pistons is produced in the opposite direction in their respective cylinders, at least two compressor cylinders arranged with their axes extending in the same general direction as the axes of said prime mover cylinders, each compressor cylinder having at least one piston reciprocatably movable therein axially thereof, said compressor cylinders and said compressor pistons being supported for reciprocating movement of said compressor cylinders and their respective compressor pistons relative to each other, means operatively connecting said compressor cylinders to said first connected pistons of said prime mover cylinders to move concomitantly therewith, and means for operatively connecting the compressor pistons to the other connected pistons of said prime mover cylinders to move concomitantly therewith and in reciprocating relation to their respective compressor cylinders.

20. A fluid pressure machine of the reciprocating type comprising at least two prime mover cylinders arranged coaxially in opposed spaced relation along their common axis, each cylinder having a pair of pistons therein for reciprocating movement thereof along said common axis thereof, the adjacently disposed pistons in said two cylinders being connected to move together and the outer pistons in said cylinders being connected to move together respectively as rigid units in the two directions of reciprocating movement along said common axis, at least one compressor cylinder arranged with its axis parallel to and offset from said common axis of said two prime mover cylinders and connected to a given one of said rigid units for reciprocating movement thereof concomitantly with reciprocating movement of the pistons of said given unit in their respective cylinders, and at least one piston in said compressor cylinder connected to the other rigid unit for reciprocating movement thereof in said compressor cylinder concomitantly with reciprocating movement of the pistons of said other unit in their respective cylinders.

21. A fluid pressure machine of the reciprocating type as defined in claim 18 which comprises a pair of gas compressor cylinders arranged in spaced relation coaxially with the common axis about which said prime mover cylinders are distributed, said compressor cylinders being disposed outwardly of the outwardly disposed pistons of said prime mover cylinders and being connected together and to said connected outwardly disposed pistons of said prime movers to move therewith, each compressor cylinder having a piston operable therein in reciprocating relation thereto, said compressor pistons being connected together and to said adjacently disposed pistons of said prime movers for movement together therewith, and means for conveying the compressed gas from said compressors through said connection between said compressor pistons.

22. In a free piston machine the combination with a cylinder for confining therein fluid under pressure, of a plurality of pistons each reciprocatable within said cylinder lengthwise thereof and acted upon by or acting on fluid confined therebetween concomitantly with change in the pressure and in the volume thereof, and means connecting alternate pistons together so as reciprocatably to move together within said cylinder.

23. In a free piston machine the combination with a cylinder for confining therein fluid under pressure, of a plurality of pistons each reciprocatable within said cylinder lengthwise thereof and acted upon by or acting on the fluid between adjacent pistons concomitantly with change in the pressure and in the volume thereof, means connecting alternate pistons together in sets reciprocatably to move together within said cylinder, and means cooperating with said cylinder and said pistons for controlling flow of fluid to and from said cylinder alternately to confine fluid under pressure between the respective pistons of a given set and the adjacent pistons of another set concomitantly with movement of said sets alternately in opposite directions of reciprocating movement.

24. In a free piston machine the combination with a cylinder for confining therein fluid under pressure, of at least three pistons each reciprocatable within said cylinder lengthwise thereof and acted upon by or acting on the fluid between adjacent pistons concomitantly with change in the pressure and in the volume thereof, means connecting together two of said pistons which are at opposite sides of an intermediate piston therebetween in said cylinder to effect movement of said two pistons together reciprocatably in said cylinder, and means cooperating with said cylinder and said pistons for controlling flow of fluid to and from said cylinder to confine fluid between said connected pistons and said intermediate piston alternately at opposite sides of said intermediate piston concomitantly with movements of said connected pistons in the directions of their reciprocating movement opposite to the directions of the concomitant reciprocating movements of said intermediate piston.

25. In a free piston machine the combination with a cylinder for confining therein fluid under pressure, of at least five successively adjacent pistons each reciprocatable in said cylinder lengthwise thereof, means connecting at least three alternate pistons together for reciprocating movement thereof together in said cylinder, at least two alternate pistons respectively intermediate between said connected pistons being independently movable in said cylinder with respect to said connected pistons, and means cooperating with said cylinder for confining therein fluid under pressure alternately between each intermediate piston and the respective adjacent pistons of said three connected pistons concomitantly with movement of said intermediate pistons alternately toward and away from said respective adjacent pistons.

26. A fluid pressure machine of the reciprocating type as defined in claim 1 in which the masses of the pistons and connections of one set are in balanced relation to the masses of the pistons and connections of the other set.

27. A fluid pressure machine of the reciprocating type comprising at least two prime mover cylinders, at least one piston in each prime mover cylinder reciprocatably movable therein axially thereof, said pistons and said cylinders cooperating to confine a fluid under pressure to produce reciprocating movements of said pistons in their respective cylinders, means operatively connecting a piston of one cylinder and a piston of another cylinder for concomitant reciprocating movement of said pistons axially in their respective cylinders, at least two compressor cylinders each having at least one piston therein, said compressor cylinders and said compressor pistons being supported for reciprocating movement of said compressor cylinders and the compressor pistons respectively therein axially relative to each other, and means operatively connecting said compressor cylinders to said connected prime mover pistons to move therewith concomitantly with said movement of said compressor cylinders and said compressor pistons respectively therein relative to each other.

ERNEST FRÉDÉRIC MERCIER.
PIERRE ERNEST MERCIER.

REFERENCES CITED

The following references are of record in the file of this patent:

UNITED STATES PATENTS

| Number | Name | Date |
|---|---|---|
| 1,230,219 | Reall | June 19, 1917 |
| 2,115,921 | Steiner | May 3, 1938 |
| 2,139,425 | Steiner | Dec. 6, 1938 |
| 2,147,935 | Steiner | Feb. 21, 1939 |
| 2,241,957 | Pescara | May 13, 1941 |
| 2,244,215 | Pescara | June 3, 1941 |
| 2,510,127 | Mercier | June 6, 1950 |

FOREIGN PATENTS

| Number | Country | Date |
|---|---|---|
| 53,936 | Netherlands | Feb. 15, 1943 |
| 855,700 | France | Feb. 1, 1939 |